Patented Mar. 27, 1945

2,372,171

UNITED STATES PATENT OFFICE 2,372,171

ANTIDIMMING COMPOSITION

Harry Bennett, Woodmere, N. Y.

No Drawing. Application April 28, 1941,
Serial No. 390,743

3 Claims. (Cl. 106—13)

This invention relates to the prevention of moisture accumulations on surfaces, and in particular is directed to improvements in antidimming or anti-fogging compounds.

The glass surfaces of binoculars and telescopes; the eye-pieces of divers' masks, gas masks, spectacles and goggles; the surfaces of windshields; and all other such surfaces have a tendency to condense moisture. As a result of such condensations the vision of the observer is diminished and often-times totally obscured. The problem has invited the attention of previous workers who have developed methods for treating the surfaces so as to prevent the condensation of moisture. These methods depend upon the spreading of a film of special compounds over the surfaces, the effect of which is to lower the surface tension of the drops of moisture formed during the condensation so that they spread out in a smooth film of great transparency.

The compounds heretofore used for their antidimming properties have depended for their effectiveness on materials which have a tendency to lower the dielectric strength of the surfaces over which they are spread, and also to produce chemical or physico-chemical changes in the adjacent materials of detrimental character. These compounds frequently contain surface tension depressants that are irritating or toxic to the observer who comes into contact with them or their vapors.

Of the many compounds used for their antidimming properties, the most frequently employed have been those based principally on soaps, sulfonated oils, saponified Turkey red oils and some hygroscopic agent such as glycerol. However, compounds prepared from the foregoing materials have not proved entirely satisfactory. They have a tendency to form films which pass too readily into solution in the water condensed on their surfaces. The compounds prepared from soap bases are alkaline in character, while those prepared from sulfonated oils are either acid or alkaline in character or tend to develop acid characteristics. Either of these deviations from chemical neutrality is undesirable, for the reason that the compound is then likely to cause damage to the treated surfaces or the materials adjacent thereto. In the case of fine, delicate optical equipment and instruments these potentially harmful characteristics are matters of considerable concern.

Furthermore, when they are exposed to moisture laden atmospheres, the sulfonated oils used as surface tension depressants in anti-dimming compounds have a marked tendency toward liquefaction due to their inherent solubility in the water condensed on the lenses or other surfaces. Under such conditions the anti-fogging film readily is washed away. When the atmosphere is dry the sulfonated oil compounds tend to undergo spontaneous desiccation. Under these conditions the anti-dimming film spread over the treated surface tends to dry out and develop perceptible opacity. The desiccated film shrinks and cracks exposing the underlying surface which condenses moisture.

Sulfonated oils, when freshly prepared, generally are alkaline, but, on exposure to the atmosphere, develop demonstrable acidity. Both the alkaline and acid phases cause irritation to tissues and especially affect the eyes. These phases are highly objectionable when the antidimming film is spread over surfaces that are in close proximity to the eyes of persons making observations through them. This is particularly so when the optical instrument is used, or the device such as a gas mask or goggles, worn for any extended length of time.

Other deficiencies or inadequacies of the antidimming preparations heretofore used will be recognized upon consideration of the following properties which should be present in an ideal agent for such application. In order to meet the rigorous requirements demanded of an antidimming composition it should:

(a) Greatly lower the surface tension of water;

(b) Readily form a uniform, cohesive, adherent, and transparent film of maximum optical qualities;

(c) If soluble in the water condensed on the filmed composition, the solution should not readily run off the treated surface;

(d) Be chemically inert to the surface filmed therewith as well as the materials adjacent thereto;

(e) Not lower the dielectric strength of the materials with which it must come into contact;

(f) Be non-irritating to tissues and eyes;

(g) Be non-toxic on direct contact or upon inhalation in vapor phases;

(h) Not contain gritty materials or have a tendency to develop them so as to cause damage through scratching on filming or defilming the optical surface;

(i) Have a consistency that will not vary greatly upon changes in temperature or atmospheric conditions;

(j) Not dry out on standing and become too hard or brittle for easy handling or application;

(k) Not absorb moisture too rapidly so as to become too soft for storage, handling or application;

(l) Not undergo spontaneous chemical or physical changes during storage that will impair its utility in any respect.

It is the object of this invention to provide a composition which will comply with the foregoing requirements for a satisfactory anti-dimming preparation.

I have found that markedly superior preparations to be used as anti-dimming compositions can be produced from polyhydroxy alcohols that have been partially esterified with higher fatty acids. They produce anti-dimming agents which can readily be spread out in thin layers, approaching monomolecular dimensions, over optical surfaces to form films of excellent transparency and great durability resulting in clearer vision and lengthened life of the film. The films formed from these anti-dimming preparations reduce the glare of sunlight or other bright lights, thus producing better vision. Camera lenses so treated minimize the ill effects of glare in photographic operations.

These partial esters also lower surface tensions to a decided degree. Although they absorb moisture condensed by them, the hydrated products thus formed do not thin out and run off. On the contrary, when these partial esters absorb moisture under such conditions, they actually thicken and develop greater viscosity. They spread evenly over the entire lens or other surface to which they are applied. Since their fluidity is not dependent on the presence of water, as is the case when using sulfonated oils, they will not dry out either in storage or in their filmed phase. These characteristics eliminate the need for incorporating either hygroscopic agents such as glycerol, or non-drying mineral oils, in order to maintain the requisite degree of fluidity demanded of an anti-dimming composition. Furthermore, they are non-injurious to the surfaces over which they are filmed and do not damage textile fabrics on which they may be spilled.

They are non-toxic, non-irritating and possess a bland odor. Since they are neither acid nor alkaline they do not etch or spoil the surfaces of glass, cellulose nitrate, cellulose acetate, acrylic or vinyl resins, ethyl cellulose, Cellophane, Pliofilm, Koroseal, or other synthetic resins or plastics. Their low surface tension causes them to spread well over all these surfaces.

The physical consistencies of these partial esters extend over a wide range. They may be obtained in the form of liquids, pastes or solids. Any desired degree of fluidity or hardness may be readily formulated by mixing or blending varying proportions of the different partial esters since they are all compatible with each other. The partial esters themselves or the various blendings of different partial esters readily form smooth homogeneous films of excellent transparency and improved durability.

The partial esters are formed by appropriate esterification of a predetermined number of hydroxyl groups with selected fatty acids. The polyhydroxy alcohols which I use for this purpose are those selected from the group consisting of: ethylene, diethylene, triethylene, the higher ethylene, and polymerized alkylene glycols, propylene and butylene glycols, and other water soluble glycols; glycerol and polyglycerols; substituted alkyldiols such as 2-methyl-2, 4 pentanediol; mannitol, sorbitol, pentaerythritol and other hexitols.

The higher fatty acids which I use for the partial esterifications are generally lauric, stearic, oleic, ricinoleic and palmitic either singly or in mixtures thereof as they occur in such oils as cottonseed, peanut, soybean or in other natural glycerides. In addition, there may be used hydroxy or polyhydroxy fatty acids having more than 5 carbon atoms in the chain, or substitution products of the above mentioned fatty acids. Examples thereof are di-hydroxy stearic acid and chlorricinoleic acid.

I have also found that in instances where some degree of alkalinity is not objectionable in the anti-dimming preparation, an amine soap may be used either as the basic ingredient or as an additive to the partial esters. For this purpose I use soaps prepared from the water soluble amines. I have found that good results are obtained by the use of soaps made from such amines as triethanolamine, ethylene diamine, hydroxyethyl ethylene diamine, isopropanolamine, octylamine, tetraethanolammonium hydroxide, tetraethylene pentamine, 2-ammo-3 hexanol, and trimethylol ammo methane. These amines may be converted into soaps by reacting them with fatty acids such as lauric, stearic, oleic and palmitic, or mixtures thereof as they occur in cottonseed, peanut, soybean oils, or other natural glycerides, or their derivatives as hereinbefore mentioned.

Although wetting agents dissolve too readily in water, with consequent acceleration of run off, they may be incorporated in my improved anti-dimming composition if it is desired further to decrease the surface tension. For this purpose, I have obtained excellent results by using wetting agents such as, water soluble salts of the sulfated higher fatty alcohols (Wetanol), sulfated hydrocarbons (Sulfatate), saponin, dialkylesters of sulfosuccinic acid (Aerosol), high molecular weight complex alcohol (Triton N. E.), dialkyl aminoethyl oleylamide acetate (Sapamine A), quaternary ammonium salts (Triton K-12), higher secondary alkyl sulfate (Tergitol). Diethylene glycol monolaurate (Glaurin) which is a partial ester of the type hereinbefore described may also be used particularly for its high wetting power.

I have obtained excellent anti-dimming effects by using diethylene glycol mono stearate which is a solid; by using triethanolamine stearate which is a softer solid and more pliable; by using polymerized glycol stearate of a molecular weight which is less than 500.

Other partial esters that are excellent materials for use as, or ingredients of, anti-dimming agents are glycerol mono ricinoleate which is liquid; propylene glycol mono laurate which is pasty; and sorbitol or glycerol mono oleates which are gels.

Other specific examples of anti-dimming compounds are:

| I | Approximate per cent |
|---|---|
| Nona ethylene glycol mono stearate | 50 |
| Ethylene glycol stearate | 50 |
| II | |
| Nona ethylene glycol stearate | 50 |
| Ethylene glycol palmitate | 50 |

Although I have found that the partially esterified polyhydroxy alcohols are remarkably efficacious for use in anti-dimming preparations, I have also found that certain completely esterified polyhydroxy alcohols may be used for the same purpose. These substances are typified by the esters prepared from polyglycols having molecular weights ranging between 550 and 5000. They form solid materials which can readily be cast into sticks for easy handling.

In all the instances where I have mentioned specific partial esters, I have referred to materials of commercial grade and not to chemically pure preparations.

The anti-dimming agents can be prepared from any of the partial esters either singly; or in combinations thereof. The anti-dimming agents can also be prepared from the amine soaps used individually or in combinations thereof. Combinations of the partial esters and the amine soaps in varying proportions will yield anti-dimming agents of predetermined consistencies.

In cases where it is desirable to use a wetting agent in the formulation of the anti-dimming compound, excellent results will be obtained by the addition of the wetting agent in an amount in the order of about one-tenth of 1%.

I claim:

1. An anti-dimming preparation comprising: a nona ethylene glycol mono ester of a fatty acid selected from the group consisting of lauric, stearic, oleic and palmitic acids; and an ethylene glycol ester of a fatty acid selected from the group consisting of lauric, stearic, oleic and palmitic acids.

2. An anti-dimming composition comprising:

| | Approximate per cent |
|---|---|
| Nona ethylene glycol mono stearate | 50 |
| Ethylene glycol stearate | 50 |

3. An anti-dimming composition comprising:

| | Approximate per cent |
|---|---|
| Nona ethylene glycol mono stearate | 50 |
| Ethylene glycol palmitate | 50 |

HARRY BENNETT.